(12) United States Patent
Ambaliya et al.

(10) Patent No.: US 11,516,186 B1
(45) Date of Patent: Nov. 29, 2022

(54) OFFBOARD STORAGE OF NON-SENSITIVE OBJECTS FOR NETWORK-BASED HARDWARE SECURITY MODULES

(71) Applicant: Amazon Technologies, Inc., Seattle, WA (US)

(72) Inventors: Mayank Bharat Ambaliya, Seattle, WA (US); Benjamin Grubin, Herndon, VA (US); Scott Samuel Adams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 16/808,994

(22) Filed: Mar. 4, 2020

(51) Int. Cl.
| | |
|---|---|
| *H04L 9/40* | (2022.01) |
| *H04L 9/08* | (2006.01) |
| *G06F 21/60* | (2013.01) |
| *H04L 9/32* | (2006.01) |
| *G06F 16/28* | (2019.01) |

(52) U.S. Cl.
CPC ........ *H04L 63/0428* (2013.01); *G06F 16/289* (2019.01); *G06F 21/602* (2013.01); *H04L 9/0877* (2013.01); *H04L 9/0897* (2013.01); *H04L 9/3247* (2013.01)

(58) Field of Classification Search
CPC . H04L 63/0428; H04L 9/0877; H04L 9/0897; H04L 9/3247; G06F 16/289; G06F 21/602
See application file for complete search history.

(56) References Cited

U.S. PATENT DOCUMENTS

| | | | |
|---|---|---|---|
| 6,611,349 B1* | 8/2003 | Vogt ...................... G06F 3/1205 | 358/1.15 |
| 8,984,274 B1* | 3/2015 | Kerzner ................ H04L 9/0891 | 713/150 |
| 2016/0210347 A1* | 7/2016 | Meyer ..................... G06F 16/93 | |

OTHER PUBLICATIONS

"Security Requirements for Cryptographic Modules", Federal Information Processing Standards Publication (FIPS PUB 140-2), National Institute of Standards and Technology, Issued May 25, 2001, 69 pages.
Dierks, T., et al., "The TLS Protocol Version 1.0," Request for Comments: 2246, Standards Track, Jan. 1999, 75 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.

(Continued)

*Primary Examiner* — Ayoub Alata
(74) *Attorney, Agent, or Firm* — Davis Wright Tremaine LLP

(57) ABSTRACT

A hardware security module (HSM) client processes a request to store data in a set of HSMs. The HSM client determines a property of the data indicative of a sensitivity classification of the data. As a result of determining the data lacks a classification as sensitive, the HSM client transmits the data to a data store outside the set of HSMs and updates a database used by the HSM client to associate an identifier of the data with a reference to a location in the data store.

20 Claims, 9 Drawing Sheets

(56) References Cited

OTHER PUBLICATIONS

Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
Mcgrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Tuexen, M., et al., "Datagram Transport Layer Security (DTLS) for Stream Control Transmission Protocol (SCTP)," Request for Comments: 6083, Standards Track, Jan. 2011, 10 pages.
Eastlake, D., "Transport Layer Security (TLS) Extensions: Extension Definitions," Request for Comments: 6066, Standards Track, Jan. 2011, 25 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Mcgrew, D., and D. Bailey, "AES-CCM Cipher Suites for Transport Layer Security (TLS)," Request for Comments: 6655, Standards Track, Jul. 2012, 8 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Kent, S., and R. Atkinson, "Security Architecture for the Internet Protocol," Request for Comments: 2401, Standards Track, Nov. 1998, 62 pages.
Orman, H., "The Oakley Key Determination Protocol," Request for Comments: 2412, Informational, Nov. 1998, 56 pages.
Kent, S., and K. Seo, "Security Architecture for the Internet Protocol," Request for Comments: 4301, Standards Track, Dec. 2005, 102 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kent, S., "IP Encapsulating Security Payload (ESP)," Request for Comments: 4303, Standards Track, Dec. 2005, 45 pages.

\* cited by examiner

OFFBOARD STORAGE OF NON-SENSITIVE OBJECTS FOR NETWORK-BASED HARDWARE SECURITY MODULES

BACKGROUND

Various cryptographic security modules (HSMs) are centrally located within network infrastructure and employed to store data of varying security sensitivity. Storage capacity of an HSM is limited, often being consumed by nonstandard use cases, including storing data of low to no sensitivity. Network systems, for example, add additional HSMs to accommodate additional storage capacity for data frequently accessed by the network but of low sensitivity. If cost or effort prevent additional HSMs added to the network, additional data that would otherwise be directed to an HSM may not be stored as securely as it should be. Additionally, while various tools are available to ensure data is securely stored, implementation can be complex and those building systems with secure storage may not appreciate all of the nuances of the various types of data that is used. For instance, an individual may not appreciate differences between cryptographic secrets and other cryptographic data that can remain public and, consequently, to ensure data is secure, may utilize HSM resources unnecessarily.

BRIEF DESCRIPTION OF THE DRAWINGS

Various techniques will be described with reference to the drawings, in which.

DETAILED DESCRIPTION

Figure 1:
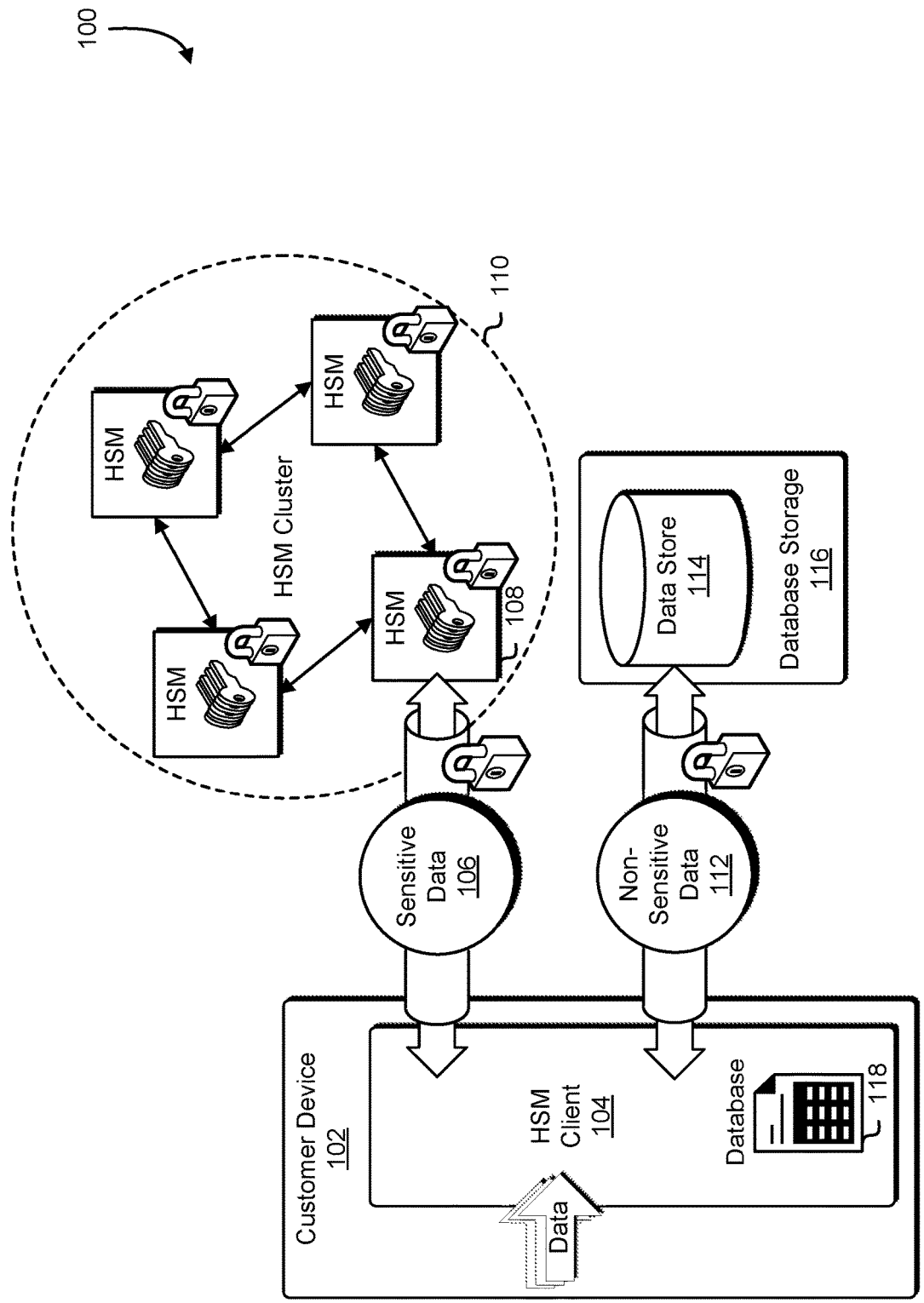
FIG. 1 is a block diagram depicting an embodiment of a system for using an HSM client to direct sensitive data to an HSM of an HSM cluster and to direct non-sensitive data to a data store.

Techniques described and suggested herein include methods, systems and processes to provide cryptographic services over a network. In one example, a computing resource service provider operates a hardware security module (HSM) client on a customer device to manage storage requests directed to an HSM. A cryptographic device client, such as an HSM client, provides an interface by which a customer device can request that sensitive and non-sensitive data be stored, such as by processing requests to store data contained within cryptographic data objects. An HSM client contains memory and processors to handle logic operations, such as determining sensitivity of data requested by a customer device to be stored.

For example, an HSM client can determine that data encapsulated in a data object is sensitive and transmits the data object to an HSM for storage. An HSM can store the data object and replicate the data object among other HSMs of an HSM cluster. Alternatively, an HSM client can determine that data encapsulated in a data object is non-sensitive, or lacks an indication of being sensitive, and transmits the non-sensitive data object to a data store separate from the HSM cluster.

Storing non-sensitive data objects on an HSM unnecessarily consumes storage memory on an HSM. Additionally, different manufactures of HSMs can support different standards of non-sensitive data or non-sensitive data objects. Accordingly, to reduce memory-related storage constraints and format-related storage constraints of an HSM and reduce computing resources allocated to an HSM, the HSM client can redirect storage requests involving non-sensitive data to separate storage, such as at a data store. In one example, an HSM client can make a determination of sensitivity of data that is then verified by a HSM load balancer before the data is stored according to a determined and verified sensitivity. Other variations, including those discussed in more detail below, are considered as being within the scope of the present disclosure.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: (1) improving efficiency and availability of onboard HSM storage by storing non-sensitive data in an off-board data store; (2) standardizing HSM storage of non-sensitive data in an off-board data store where a subset of a cluster of heterogeneous HSMs would only be capable of storing onboard particular non-sensitive data; (3) reducing complexity of storing non-sensitive data a customer can request of an HSM by having at least an HSM client service handle differences in HSM hardware for a cluster of heterogeneous HSMs; and (4) facilitating an appearance that an HSM functions as a central data store for synchronization and distribution of credentials, public keys, or certificates by storing such non-sensitive data in an off-board and separate data store relative to the HSM while allowing the HSM or traffic from a customer device to the HSM to access the off-board data store.

FIG. 1 is a block diagram depicting an embodiment of a system for using a client (also referred to as an HSM client or cryptographic device client) to direct sensitive data to an HSM of an HSM cluster (also referred to as an HSM fleet)

and to direct non-sensitive data to a data store. An example environment 100 of such a system can include a customer device 102, which can request that data be stored, such as data related to cryptographic operations, to an HSM client 104. Examples of a customer device include a virtual computing instance and client devices, as described below regarding FIG. 8. The customer device 102 can provide the data to the HSM client 104. In some examples, the customer device 102 is hosted by the same entity that hosts one or more HSMs with which the HSM client 104 communicates, such as a computing resource service provider that provides use of the customer device 102 and the one or more HSMs as a service (sometimes referred to as a cloud provider). Examples of data include cryptographic keys, such as public and private keys of a symmetric key pair, symmetric keys. Data can also include certificates, algorithm and key length information, and attributes of digital signatures.

The request from the customer device 102 can be formed according to a standard, such as a platform independent standard. Examples of standards include PKCS #11, Java Cryptography Engine, JSON-e, Java Cryptography Architecture (JCA), JSON-a, Microsoft® CryptoAPI, Microsoft® Cryptography API: Next Generation (CNG), etc. In alternative embodiments, a data object can be formed according to a platform dependent standard. A standard can include specifications for application programming interface (API) requests for the reading, writing, and use of data objects. In an embodiment, the request type is independent of the sensitivity of the data object. For example, the same type of request, such the same type of API call, can be utilized in a request for storing either a sensitive or non-sensitive data object.

The HSM client 104 can determine where to store the data based on a determination of sensitivity of the data. For example, the HSM client 104 can determine that a request to store data specifies that the data is sensitive. When the HSM client 104 determines that data is sensitive, such sensitive data 106 can be transmitted to a cryptographic device, such as the HSM 108. Cryptographic devices can include devices capable of accelerating and decrypting Secure Sockets Layer (SSL) or Transport Layer Security (TLS) communication. Cryptographic devices can include hardware devices that protect internally stored information from external attacks. Cryptographic devices can contain a crypto-processor that manages digital keys, accelerates cryptographic processes, and provides access authentication for application encryption keys. As a hardware device, a cryptographic device can be in the form of slotted cards (e.g., PCI-e cards), external devices that can be attached directly to a network (e.g., by physical cables or port, such as universal serial bus (USB)), or embedded in a hardware system (e.g., trusted platform modules (TPMs)).

The HSM 108 can be a member of an HSM cluster 110. In an embodiment, each HSM within the HSM cluster can communicate with one or more other HSMs in the cluster. HSMs within the HSM cluster 110 can replicate sensitive data such that an individual HSM contains the transmitted sensitive data 108 although that individual HSM did not obtain the sensitive data 108 directly from the HSM client 104. In an embodiment, HSMs within the HMS cluster 110 can be of different properties and characteristics, where each category of HSMs can supporting different types of data objects. For example, the HSM cluster 110 can include HSMs of a variety of manufactures where each manufacturer supports a set of types of data objects. Due to the cluster being networked, the set of types of data objects supported by the HSM cluster 110 is the super set of the set of types of data objects supported by each HSM in the HMS cluster 110.

Each HSM in the cluster 110 of HSMs, in an embodiment, is a device that provides hardware-based protection of cryptographic secrets so that, for example, cryptographic secrets are non-exportable and physical intrusion into the HSM causes any cryptographic material stored by the HSM to be destroyed. An HSM can also include one or more crypto-processors to perform cryptographic operations using such secrets. In an embodiment, each HSM in the cluster 110 is compliant to the Federal Information Processing Standard (FIPS) Publication 140-2 and, in some embodiments, compliant with FIPS 140-2, levels 1, 2, 3, and/or 4. In an embodiment, each HSM in the cluster 110 of HSMs has obtained applicable certification as being compliant with one or more FIPS levels or other compliance regime.

Alternatively, the HSM client 104 can determine that a request to store data specifies that the data is non-sensitive or lacks a specification of whether the data is sensitive. For example, data can be specified with a sensitivity label as non-sensitive in the request to store data. Alternatively, the request to store data, or metadata included with the data, can lack a sensitivity label (e.g., unmarked as either sensitive or non-sensitive). When data lacks a specification of whether the data is sensitive, the HSM client 104 can access metadata attached to the data to determine sensitivity. For example, the data can be encapsulated in a data object with metadata where the metadata includes a property or characteristic of the data. One or more properties can be expressed as fields in a table, such as described regarding FIG. 4 below. A property of sensitivity can be a data type of the data or a field specifying a sensitivity characteristic of the data.

In an embodiment, the determination of data being sensitive can be based on a specification or classification included in the data object, where such a classification outweighs or otherwise indicates sensitivity regardless of additional metadata included in the data object. For example, a customer can indicate that data is sensitive, such as by specifying the data is sensitive in a request to store the data or by labeling a field of metadata included the data as classifying the data as sensitive, and the HSM client 104 will direct such data to the HSM 108, such as according to a set of rules or policies for storing sensitive data in an HSM. Alternatively, a data object can include a classification as non-sensitive and the HSM client 104 can determine that the data object represents sensitive data based on other properties of the data object, a property of the request to store the data, or included metadata, such as a data type indicative of the data object being sensitive. In an embodiment, a data object lacking an indication, specification, or other means of being determined as sensitive can cause the HSM client 104 to default to classifying the data object as being sensitive. In accordance with the set of rules or policies for storing sensitive data in an HSM, the HSM client 104 directs the data object of a sensitive type to be stored in an HSM.

In an embodiment, a rule or policy can indicate that a data object, or request specifying the data object, including a classification of the data object as non-sensitive be stored in sensitive data storage, such as at an HSM. A rule or policy can be set by a customer associated with the customer device 102 or by a computing resource service provider, such as computing resource service provider 304. For example, a customer can set a policy to indicate that otherwise non-sensitive data of a certain property (e.g., a particular data type) is to be treated as sensitive and stored accordingly (e.g., sensitive data is to be stored in an HSM). Anile or policy can be modified after the rule or policy is created. Examples of rules and policies include role-based access control policies and identity-and-access-management policies.

In an embodiment, the HSM client 104 can determine (e.g., a computer system running the HSM client 104 can determine) that a data object encapsulating the data does not conform to a standard supported by a cryptographic device in a cluster of cryptographic devices, such as HSMs. In such a determination, the HSM client 104 determines that the non-conforming data object is non-sensitive and transmits said data object to a data store, such as data store 114.

When the HSM client 104 determines that data is non-sensitive, such non-sensitive data 112 can be transmitted to a data store 114. A rule or policy can be implemented to cause the HSM client 104 to direct non-sensitive data to the data store 114. The data store 114 can be hosted within database storage 116. Database storage 116 can be a service operating separate from the HSM cluster 110. In an embodiment, the HSM client 104 stores a database 118. The database 118 can store locations (e.g., addresses) of data objects, for example, indicating which HSM contains a sensitive data object or which data store contains a non-sensitive data object. In an embodiment, the HSM client 104 updates the database 118 used by the HSM client 104 to associate an identifier (also referred to as a handle) of the non-sensitive data with a reference to a location in the data store 114. Alternatively, the identifier is of a data object containing the non-sensitive data. In an alternate embodiment, a service operating the data store 114, such as a service operating database storage 116, causes an update to the database 118 that associates an identifier of the non-sensitive data 112 with a reference to a location in the data store 114, such as for the HSM client 104 to access the non-sensitive data 112. A location of a data object can be determined through heuristics based on a property of the data object. For example, a data object with a specified property would be associated with a particular storage location, such as a data object including sensitive data being stored at the HSM 108 of the cluster 110 and non-sensitive data being stored at the data store 114.

The HSM client 104 can communicate with an HSM 108 by an encrypted or otherwise cryptographically protected communications session, such as Transport Layer Security (TLS) session. The HSM client 104 can be accessible on the same network as the HSM 108, such as a virtual private network (VPN). The HSM client 104 can communicate with the data store 114 by an encrypted session, such as a TLS session. The HSM client 104 and data store 114 can likewise be on the same network, such as the same or another private network.

In an embodiment, data stored in the HSM 108 or data store 114 can be moved to another location. For example, data initially indicated as non-sensitive and transmitted to the data store 114 can subsequently be modified to be indicated as sensitive data. In such an example, the HSM client 104 can obtain a request to modify sensitivity of the data. The HSM client 104 access the database 118 to locate the data to be modified, obtains the data, transmits the data to the HSM 108, and updates the location of the data in database 118. Storage locations in the data store 114 associated with the data can be overwritten, such as by writing zeroes, random data, or otherwise to ensure that the data is not readable from the data store 114 so as to remove the data from the data store 114.

A cryptographic device, such as the HSM 108, can be remote to the HSM client 104, such as an HSM accessible to the HSM client 104 over a network connection, including an HSM not co-located with the customer device 102. Remote can also refer to the HSM client 104 and HSM 108 being on different devices, accessible via a network, or otherwise separated as described herein. In an alternate embodiment, a cryptographic device, such as the HSM 108, can be co-located on the customer device 102. In an embodiment, the data store 114 can be co-located on the customer device 102.

Figure 2:
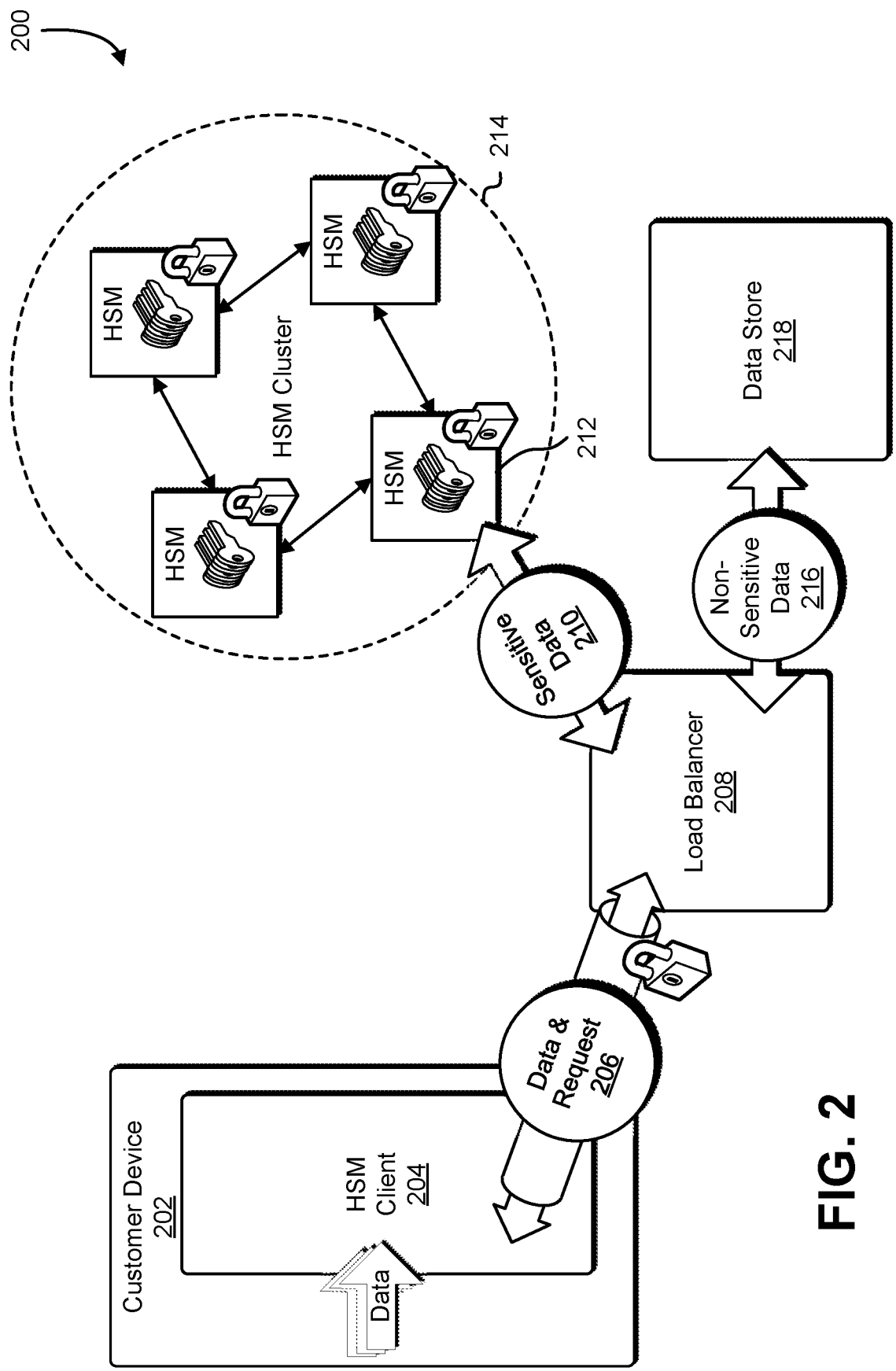
FIG. 2 is a block diagram depicting an embodiment of a system for using an HSM load balancer to direct sensitive data to an HSM of an HSM cluster and to direct non-sensitive data to a data store.

FIG. 2 is a block diagram depicting an embodiment of a system for using an HSM load balancer to direct sensitive data to an HSM of an HSM cluster and to direct non-sensitive data to a data store. An example environment 200 of such a system can include a customer device 202, similar to customer device 102, which can request that data be stored, such as data related to cryptographic operations, to an HSM client 204. The customer device 202 can provide the data to the HSM client 204. Examples of data include cryptographic keys, such as public and private keys of a symmetric key pair, symmetric keys. Data can also include certificates, algorithm and key length information, and attributes of digital signatures.

The request from the customer device 202 can be formed according to a standard as discussed above regarding FIG. 1. The HSM client 204 can determine sensitivity of data, or a data object encapsulating the data, such as described above regarding FIG. 1. The HSM client 204 can modify the request to store the data with information indicative of sensitivity of the data as determined by the HSM client 204. The HSM client 204 can transmit data and a request to store the data 206, including a modification to the request, to a loader balancer 208. In an embodiment, the load balancer 208 is an HSM load balancer separate from an HSM. In another embodiment, the loader balancer 208 is an HSM. The load balancer 208 can be an intermediary between the HSM client 204 and a storage location for the data object. For example, the load balancer 208 can separate the customer device 202 from the HSM cluster 214, separate the customer device 202 from the data store 218, separate the HSM cluster 214 from the data store 218, or some combination thereof.

The loader balancer 208 can determine where to store the data based on a determination of sensitivity of the data. For example, the loader balancer 208 can determine that a request to store data specifies that the data is sensitive. The loader balancer 208 can make such a determination as a result of identifying a specification, marking, or indication that the data is sensitive in a request as modified by an HSM client 204. When the loader balancer 208 determines that data is sensitive, such sensitive data 210 can be transmitted to a cryptographic device, such as an HSM 212. Cryptographic devices can include devices capable of accelerating and decrypting Secure Sockets Layer (SSL) or Transport Layer Security (TLS) communication. Cryptographic devices can include hardware devices that protect internally stored information from external attacks. Cryptographic devices can contain a crypto-processor that manages digital keys, accelerates cryptographic processes, and provides access authentication for application encryption keys. As a hardware device, a cryptographic device can be in the form of slotted cards (e.g., PCI-e cards), external devices that can be attached directly to a network (e.g., by physical cables or port, such as universal serial bus (USB)), or embedded in a hardware system (e.g., trusted platform modules (TPMs)). The HSM 212 can be a member of an HSM cluster 214, such as described above regarding FIG. 1. Alternatively, the loader balancer 208 can determine that a request to store data specifies that the data is non-sensitive or lacks a specification of whether the data is sensitive. For example, data can be specified with a sensitivity label as non-sensitive in the request to store data. Alternatively, the request to store data or metadata included with the data can lack a sensitivity label. When data lacks a specification of whether the data is sensitive, the loader balancer 208 can access metadata attached to the data to determine sensitivity.

For example, the data can be encapsulated in a data object with metadata where the metadata includes a property of the data. One or more properties can be expressed as fields in a table, such as described regarding FIG. 4 below. A property of sensitivity can be a data type of the data or a field specifying a sensitivity characteristic of the data. In an embodiment, the loader balancer 208 can determine that a data object encapsulating the data does not conform to a standard supported by a remote cryptographic device in a cluster of remote cryptographic devices, such as HSMs. In such a determination, the loader balancer 208 determines that the non-conforming data object is non-sensitive and transmits said non-sensitive data 216 to a data store 218. The data store 218 can be similar to a data store 114 described above regarding FIG. 1, such as being hosted by a database storage service. Additionally, a database associating an identifier of the non-sensitive data 216 with a reference to a location in the data store 218 can be updated by an HSM client 204, or otherwise caused to be updated by an load balancer 208 or a service operating data store 218, such as for an HSM client 204 to access the non-sensitive data 216 and, in some embodiments, similar to database updating as described above regarding FIG. 1.

In an embodiment, the load balancer 208 can determine the location of a stored data object based on a database, such as described above for the HSM client 104 accessing a database 118 to retrieve a data object. In another embodiment, the load balancer 208 can determine the location of a stored data object based on heuristics, such as based on a property of the data object. For example, a data object with a specified property would be associated with a particular storage location, such as a data object including sensitive data being stored at the HSM 212 of the cluster 214 and non-sensitive data being stored at the data store 218. In an example, a policy or rule can specify that a data object classified as non-sensitive data and having a specified property as a certificate be stored at an HSM based on the policy dictating that data objects of the certificate type be stored at an HSM.

In the embodiment where the loader balancer 208 is an HSM, the load balancer 208 can determine whether to store sensitive data 210 locally or transmit the sensitive data 210 to another HSM of the HSM cluster 214. The load balancer 208 as an HSM can transmit non-sensitive data, such as a determined by the HSM client 204, by the loader balancer 208, or combination thereof, to the data store 218 as described herein.

The HSM client 204 can communicate with the load balancer 208 by an encrypted session, such as a TLS session or otherwise within a secure communication channel, such as an encrypted channel accessible to computing resources within a virtual private network (VPN). The client load balancer 208, HSM 212, and the data store 218 can likewise be on the same network, such as the same or another private network.

Figure 3A:
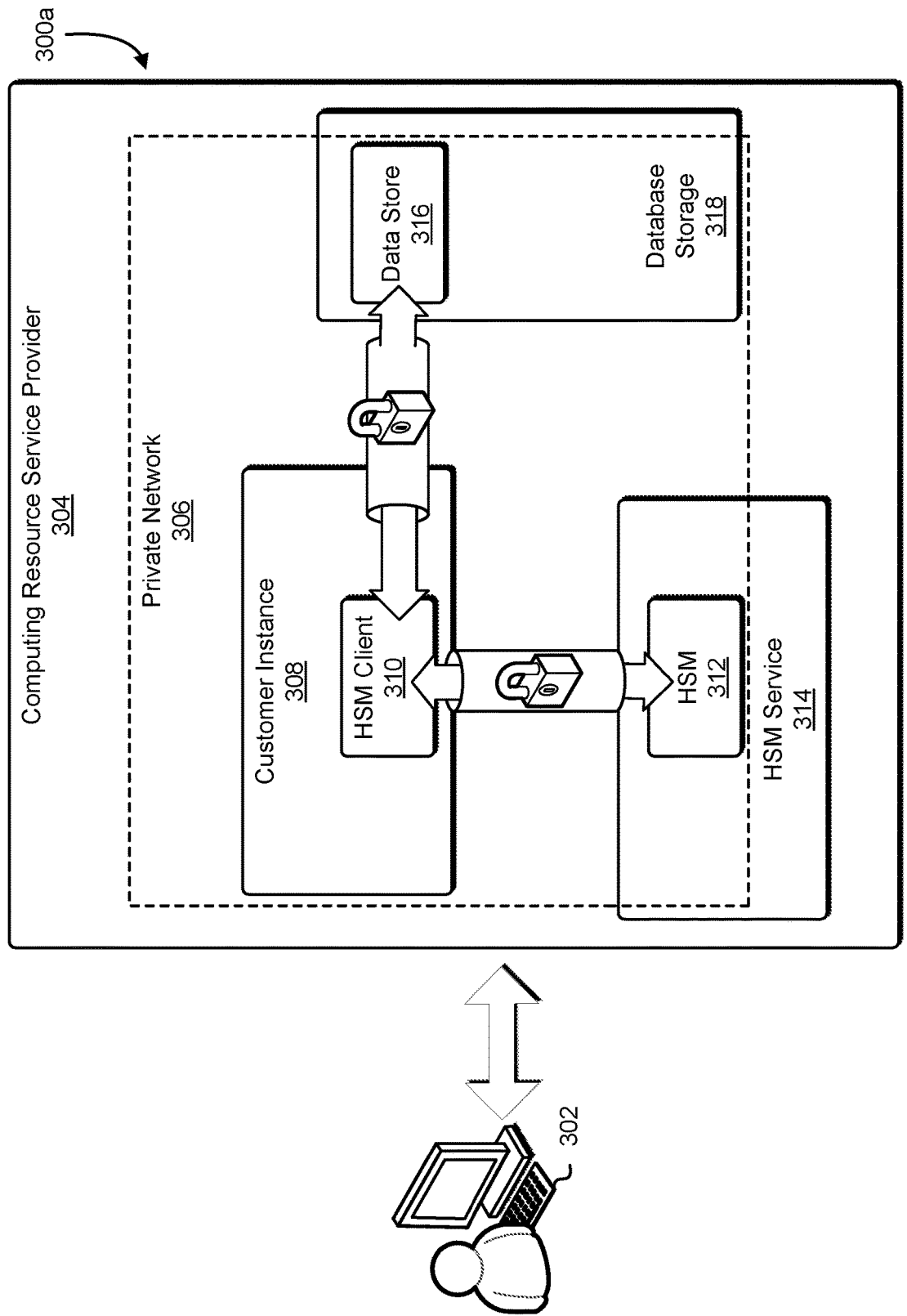
FIG. 3A is a block diagram depicting an embodiment of a system environment for using a customer private network to secure data traffic between an HSM client on a customer instance, a data store within the customer's private network, and an HSM of an HSM service.

FIG. 3A is a block diagram depicting an embodiment of a system environment for using a customer private network to secure data traffic between an HSM client on a customer instance, a data store within the customer's private network, and an HSM of an HSM service. In an embodiment, a system environment 300a includes a customer device 302 interacting with a computing resource service provider 304. The customer device 302 can be a client device as described regarding FIG. 8 below.

The computing resource service provider 304 can host a private network 306. The private network 306 can include an on-demand configurable pool of shared computing resources provided by the computing resource service provider 304 that can be allocated within a public cloud environment while providing isolation between different customers or entities using the resources. The private network 306 can be referred to as a virtual private cloud (VPC), and can be implemented by a private cloud appliance or similar private network computing resources. A private network 306 can span one or more physical networks. A private network 306 can be implemented in whole or in part on one or more devices hosted by the computing resource service provider 304.

In an embodiment, a private network 306 allows a customer to launch resources into a virtual network that the customer has defined by submitting web service API calls to a control plane of a system of the computing resource service provider 304 from the customer (or possibly from a server with instructions from the customer). A private network can be a virtual network that closely resembles a traditional network that a customer operates in their own data center, with the benefits of being able efficiently scale the network up or down when necessary. In an embodiment, the customer configures the amount of computing resources to form the private network 306. In an embodiment, the private network 306 includes a subset of the resources that are grouped together to form a subnet. This subnet can include a range of IP addresses in the customer's private network. Moreover, in an embodiment, a private network includes a route table that contains a set of rules, also referred to as routes, which can be used to determine where network traffic is directed. The customer's private network can also include an internet gateway that is a horizontally scaled, redundant, and highly available component that allows communication between instances in the customer's private network and the internet.

The private network 306 can host a customer instance 308. The customer instance 308 can be a virtual computing instance accessible to a customer by the customer device 302 while providing the customer access to computing resources of the computing resource service provider 304. An HSM client 310 can operate on the customer instance 308 as a service, such as to communicate over a network with other devices and services of the computing resource service provider 304. For example, the HSM client 310 can communicate with an HSM 312. The HSM client 310 can operate as a service by providing a web service through which a customer can access resources of the computing resource service provider 304, such as initializing and operating virtual compute instances.

The HSM 312 can be included in an HSM cluster operated by an HSM service 314. The HSM service 314 can serve multiple customers, each customer with access to a private network of a pool of computing resources. The HSM client 310 can transmit data to the HSM 312 by an encrypted or otherwise cryptographically protected communication session, such as Transport Layer Security (TLS). Alternatively or in addition to, the HSM client 310 can communicate with the data store 316. The data store 316 can be contained in the database storage 318, which can operate as a storage service.

The HSM client 310 can transmit data to the data store 316 by an encrypted session or within a secure communication channel as described herein.

Figure 3B:
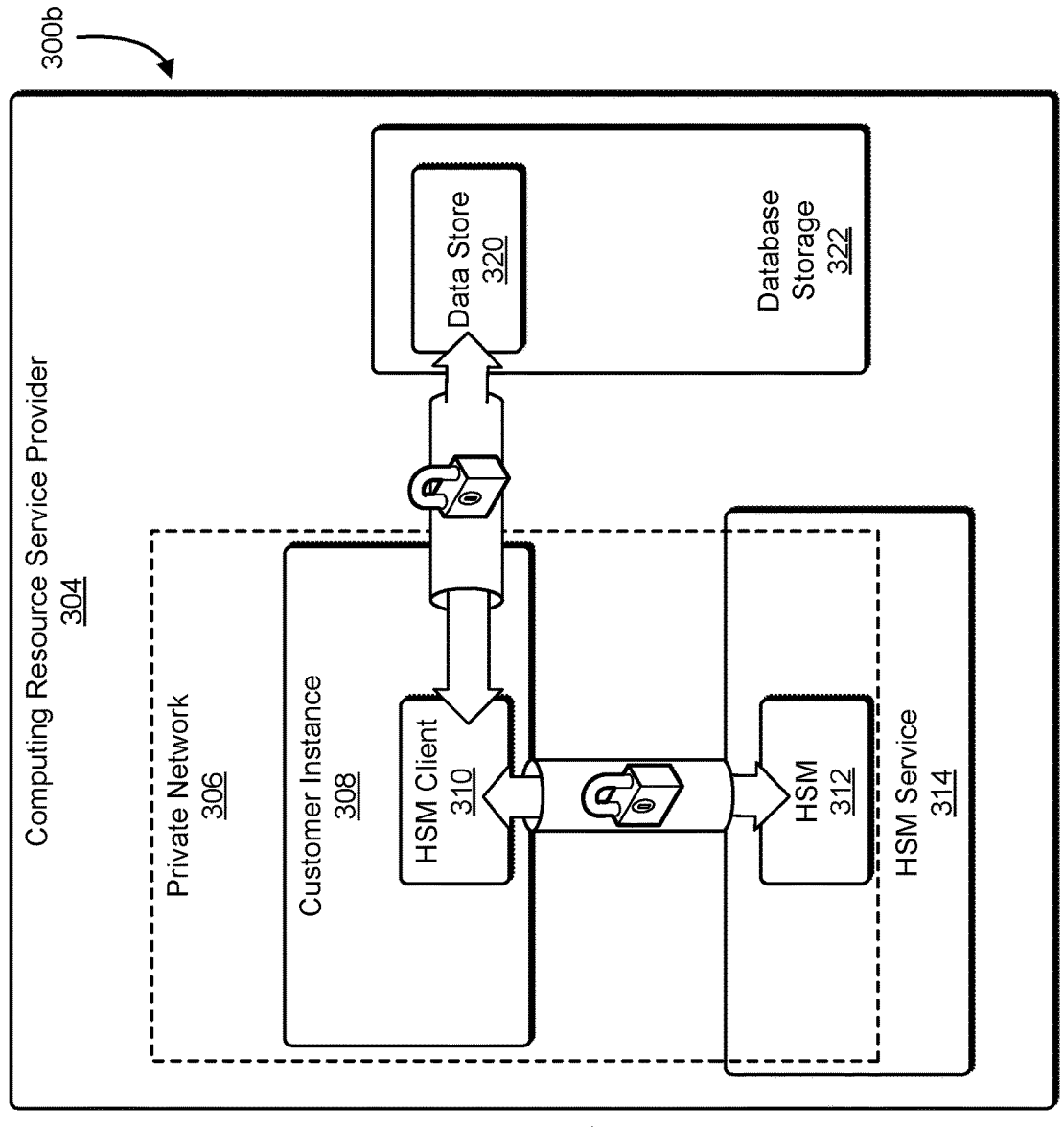
FIG. 3B is a block diagram depicting an embodiment of a system environment for using a customer private network to secure data traffic between an HSM client on a customer instance, an HSM of an HSM service, and a data store outside the customer's private network.

FIG. 3B is a block diagram depicting an embodiment of a system environment for using a customer private network to secure data traffic between an HSM client on a customer instance, an HSM of an HSM service, and a data store outside the customer's private network. In an embodiment, a system environment 300b includes the customer device 302 interacting with the computing resource service provider 304, such as described above regarding FIG. 3A.

The HSM client 310 can communicate with a data store 320. The data store 320 can be contained in the database storage 322, which can operate as a storage service outside of the customer private network 306. The data store 320 can be a resource provided by the computing resource service provider 304. The database storage 322 can serve multiple customers, each customer with an individual private network. The HSM client 310 can transmit data to the data store 320 by an encrypted session or within a secure communication channel as described herein.

Figure 4:
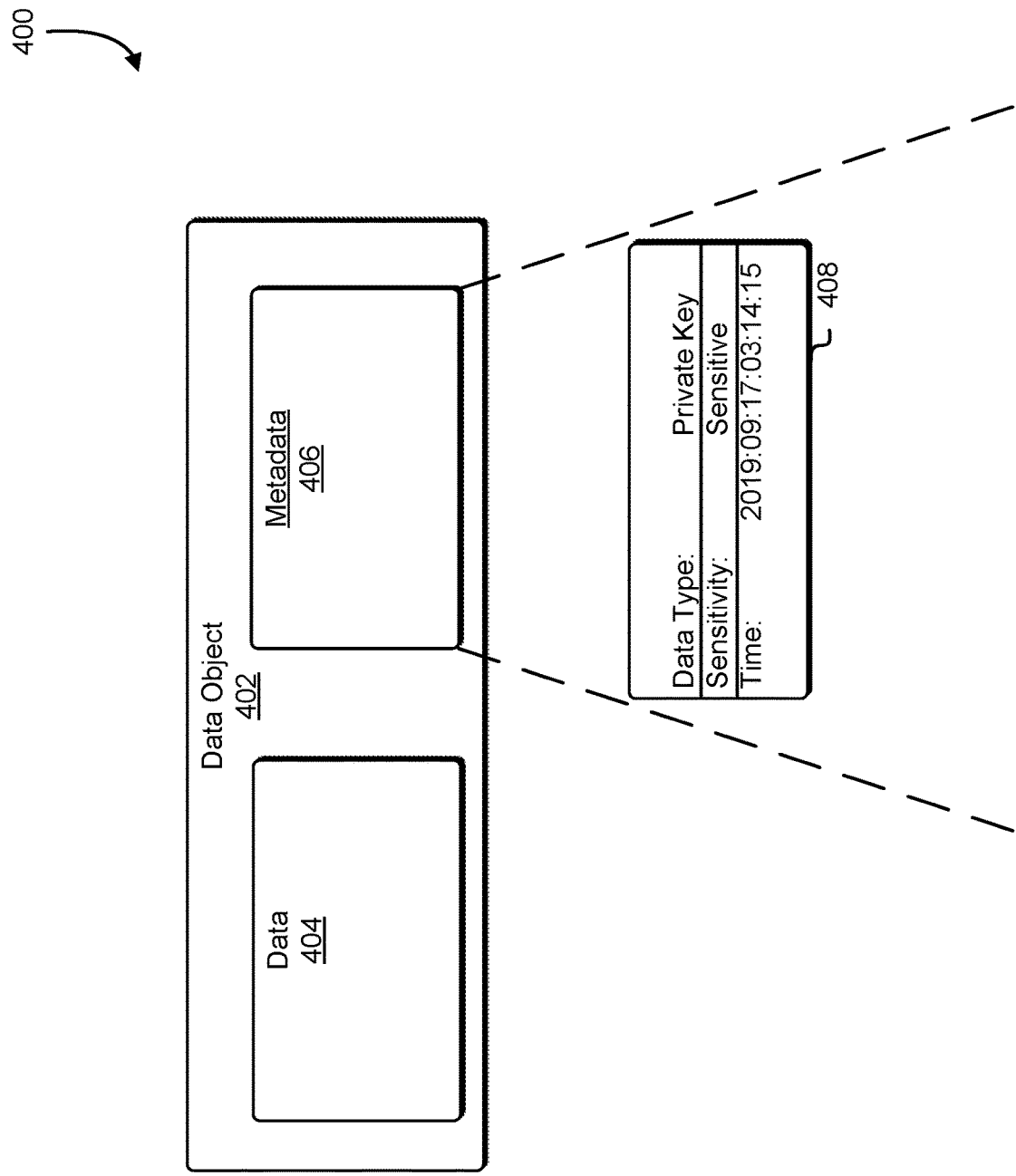
FIG. 4 is a block diagram depicting an embodiment of a data object including metadata indicating the sensitivity of data within the data object.

FIG. 4 is a block diagram depicting an embodiment 400 of a data object. A data object 402 can include data 404 and metadata 406 indicating the sensitivity of data 404. The data object 402 can be a cryptographic object. Examples of a data object 402 include certificate store objects, digital signature objects, enveloped data objects, data encryption objects, or auxiliary objects. The data object 402 can be usable within a cryptographic standard, such as a platform independent standard, for instance PKCS #11.

Examples of data 404 encapsulated in certificate store objects include a digital certificate, a certificate validation chain, a private key, a public key, properties or methods regarding certificate use, and templates. Examples of data 404 encapsulated in digital signature objects include a signed code, signature, and signer information. Examples of data 404 encapsulated in enveloped data objects include enveloped data and recipients. Examples of data 404 encapsulated in data encryption objects include objects to encrypt/decrypt data, such as private and public keys for asymmetric key pairs or a symmetric key. Examples of data 404 encapsulated in auxiliary objects include algorithm and key length information, attributes of a signature, certificate constraints, hashes, key usage information, and policy information. Such examples of data 404 can be referred to as a type of data or data type. In an embodiment, a symmetric key and a private asymmetric key can be associated with a sensitive type of data while a public asymmetric key can be associated with a non-sensitive type of data. In some embodiments, such examples of data objects can be used as a proxy for a data type regardless of the encapsulated data. For example, due to a compliance standard, any digital signature object can be treated as a sensitive type of data.

Metadata 406 can be formed from one or more properties of data 404, which can be expressed in a table 408. Examples of properties included within metadata table 408 can include a data type of the data 404, a marked sensitivity of the data 404, or a time stamp of an operation involving the data object 402 or the data 404, such as a generation time, modification time, and usage times.

Figure 5:
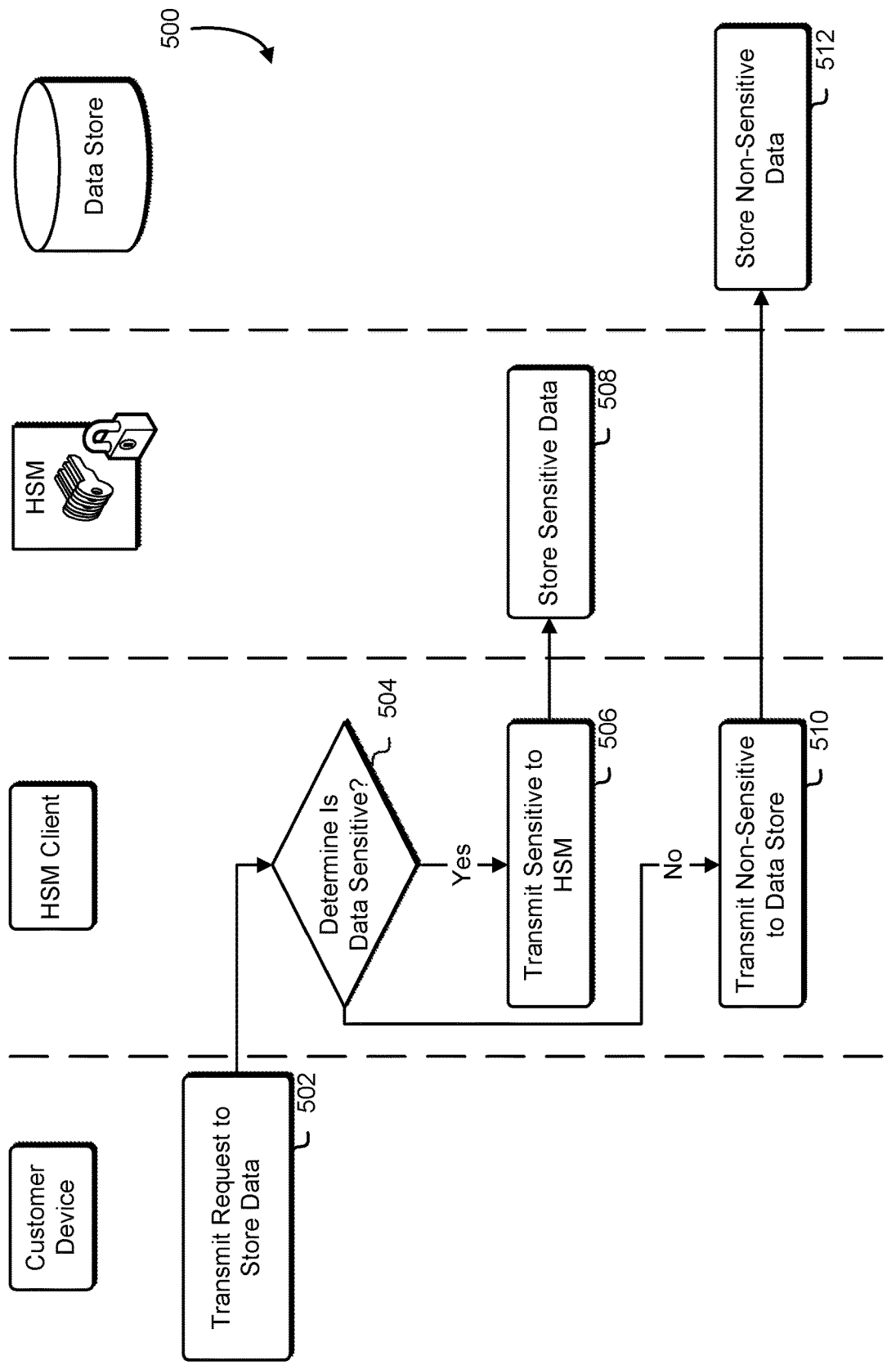
FIG. 5 shows an illustrative example of a process that, as a result of being performed by a customer device, an HSM client, an HSM, and a data store to determine sensitivity of data and store the data according to sensitivity.

FIG. 5 shows an illustrative example of a process that, as a result of being performed by a customer device, an HSM client, an HSM, and a data store to determine sensitivity of data and store the data according to sensitivity, in accordance with an embodiment. A swim diagram 500 illustrates an embodiment of a system for determining sensitivity of data and storing the data accordingly. In an environment, as a result of the process illustrated in FIG. 1, a customer device transmits 502 a request to an HSM client to store data. The request can be an application programming interface request that invokes an API of the HSM client. The request can be formed according to a standard, such as a platform independent standard. Examples of standards to which the request can be formed include PKCS #11, Java Cryptography Engine, JSON-e, Java Cryptography Architecture (JCA), JSON-a, Microsoft® CryptoAPI, Microsoft® Cryptography API: Next Generation (CNG), etc.

The HSM client determines 504 whether data is sensitive. The HSM client can make the determination based on an indication in the request transmitted from the customer device. The HSM client can make the determination based on a property of the data. In an embodiment, a property or characteristic of the data can be included in metadata, such as metadata of a data object encapsulating the data. Metadata can include one or more fields, such as discussed above regarding FIG. 4. Such fields, for example, can characterize a data type of the data, sensitivity of the data, or a timestamp of when the data or data object was generated. In an embodiment, a data type can indicate that the data contains a private cryptographic key. In such an example, a sensitivity field, if included with the metadata, can indicate that the private key is indicative of sensitive data. In an alternate example, a data type can indicate that the data contains a public cryptographic key, in such an example, a sensitivity field, if included with the metadata, can indicate that the public key is indicative of non-sensitive data or otherwise lack a characterization of being sensitive data. In an embodiment, the HSM client can access a database table associating various data types with a sensitivity indication. In such an example, the HSM client can additionally verify sensitivity of a data object by comparing a metadata sensitivity indication included with the data object with the database table indication of sensitivity for a data object of a data type indicated by the metadata. Depending on a system configuration, an HSM client can determine sensitivity of a data object based on the database table indication of sensitivity, overriding a metadata indication of sensitivity. Alternatively, an HSM client can determine sensitivity of the data object based the metadata indication of sensitivity, overriding a conflicting database table indication of sensitivity.

If the HSM client determines that the data is sensitive, then, in this example, the HSM transmits 506 the data to an HSM. The HSM client can transmit the data to the HSM by an encrypted or otherwise cryptographically protected communication session, such as Transport Layer Security (TLS). The HSM stores 508 the sensitive data, at least in local memory of the HSM. The HSM can replicate the sensitive data and transmit the replicated sensitive data to additional HSMs within a cluster of HSMs including the HSM.

If the HSM client determines that the data is lacking a classification as sensitive, then the HSM transmits 510 the data to a data store. The HSM client can transmit the data to the data store by an encrypted or otherwise cryptographically protected communication session, such as TLS. The data store then stores 512 the data. As discussed above in FIG. 1, a data store can be hosted within database storage, such as a database storage service. The database storage service can operate separate from HSMs. In an embodiment, a database storage service updates a database used by the HSM client to associate an identifier of the data object with a reference to a location in the data store. In an embodiment, the HSM client updates a database used by the HSM client to associate an identifier of the data object with a reference to a location in the data store. Updating the database can include generating or modifying a key handle for the data indicative of the data being stored in the data store.

Figure 6:
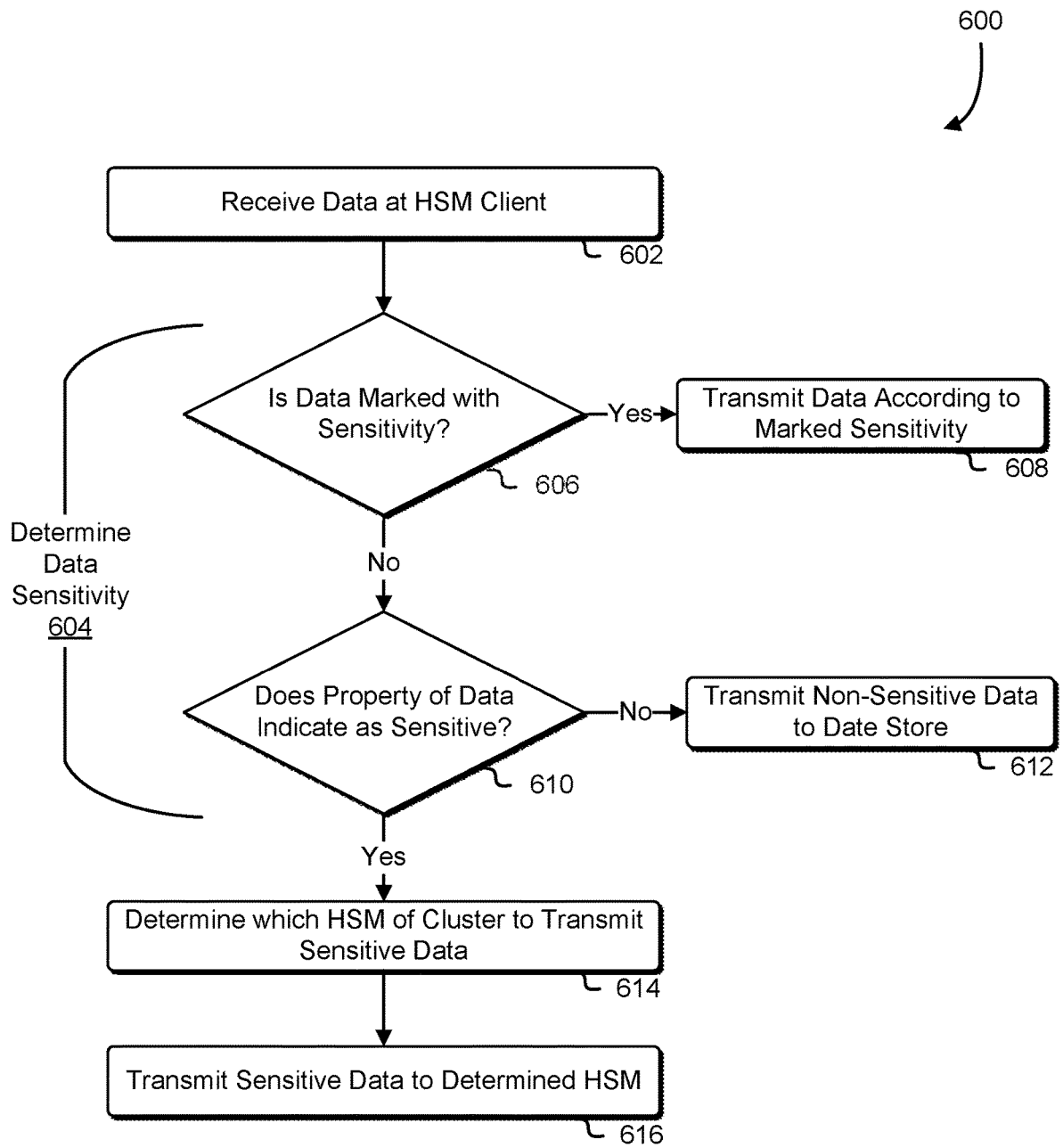
FIG. 6 is a flowchart depicting an embodiment of a system for determining sensitivity of data and transmitting the data accordingly.

FIG. 6 is a flowchart depicting an embodiment of a system for determining sensitivity of data and transmitting the data accordingly. In an environment 600, as a result of the process illustrated in FIG. 5, a HSM client can receive 602 or otherwise obtain data from a customer device. The HSM client can operate on the customer device. Data can be encapsulated within a data object, such as a cryptographic object. A data object can include the data and metadata. Metadata can include properties, such as in table fields that describe or characterize the data. Data object metadata can include an indication or marking of the data as sensitive, a data type of the data, or a time stamp, such as when the data was generated, when the data object was formed, first use time, or a last use time.

The HSM client can determine 604 sensitivity of the received or otherwise obtained data, which can include one or more sub-determinations. The HSM can determine 606 that the data, or request indicating the data, is lacking a marking as sensitive. For example, the data can be encapsulated in a data object, the data object including metadata indicating a property or characteristic of the data indicative of the data being sensitive. In an embodiment, metadata can include information, such as discussed in FIG. 4, indicating that the data is sensitive. In an embodiment, a request obtained by the HSM client to store the data can indicate that the data is sensitive.

If the data is marked or indicated as sensitive, the HSM client can transmit 608 the data accordingly. For instance, data marked as sensitive can be directed to an HSM while data marked as non-sensitive can be directed to a data store separate from an HSM. Alternatively, if the data is not marked or indicated with a sensitivity, the HSM client can determine 610 whether a property of the data is indicative of sensitivity of the data. For instance, metadata included with the data can contain a property or characteristic, such as expressed in a field of a table, indicative of a data type of the data. The HSM client can access a database table to perform a lookup operation to associate the data type with a corresponding listing of sensitivity as indicated in the database table. Alternative factors can also weigh on the HSM client determination of sensitivity, such as time stamp information or an identifier of the customer device that requested the data be stored. In an embodiment, the HSM client can determine sensitivity of the data in accordance with a rule or policy, such as described above.

If the property of the data indicates the data as non-sensitive or characterized by lacking sensitivity, the HSM client transmits 612 such non-sensitive data to a data store. The HSM client can transmit the data to the data store by an encrypted or otherwise cryptographically protected communication session, such as TLS. In an embodiment, and as discussed above in FIGS. 1 and 5, the HSM client can update a database used by the HSM client to associate an identifier of the data with a reference to a location in the data store. Updating the database can include generating or modifying a key handle for the data indicative of the data being stored in the data store.

If the property of the data indicates the data as sensitive, the HSM client can determine 614 which HSM to transmit the sensitive data. For example, the HSM client can be configured to distribute sensitive data to a specific HSM based on a property of the data (e.g., data type) or a property of the HSM (e.g., storage capacity). A property of the HSM can refer to hardware characteristics of the HSM, network characteristics of the HSM, or physical characteristics of the HSM (such as a geographic location of the HSM). The HSM client then transmits 616 the determined sensitive data to the determined HSM. The HSM client can transmit the data to the HSM by an encrypted session, such as TLS or similar secure communication channel.

Figure 7:
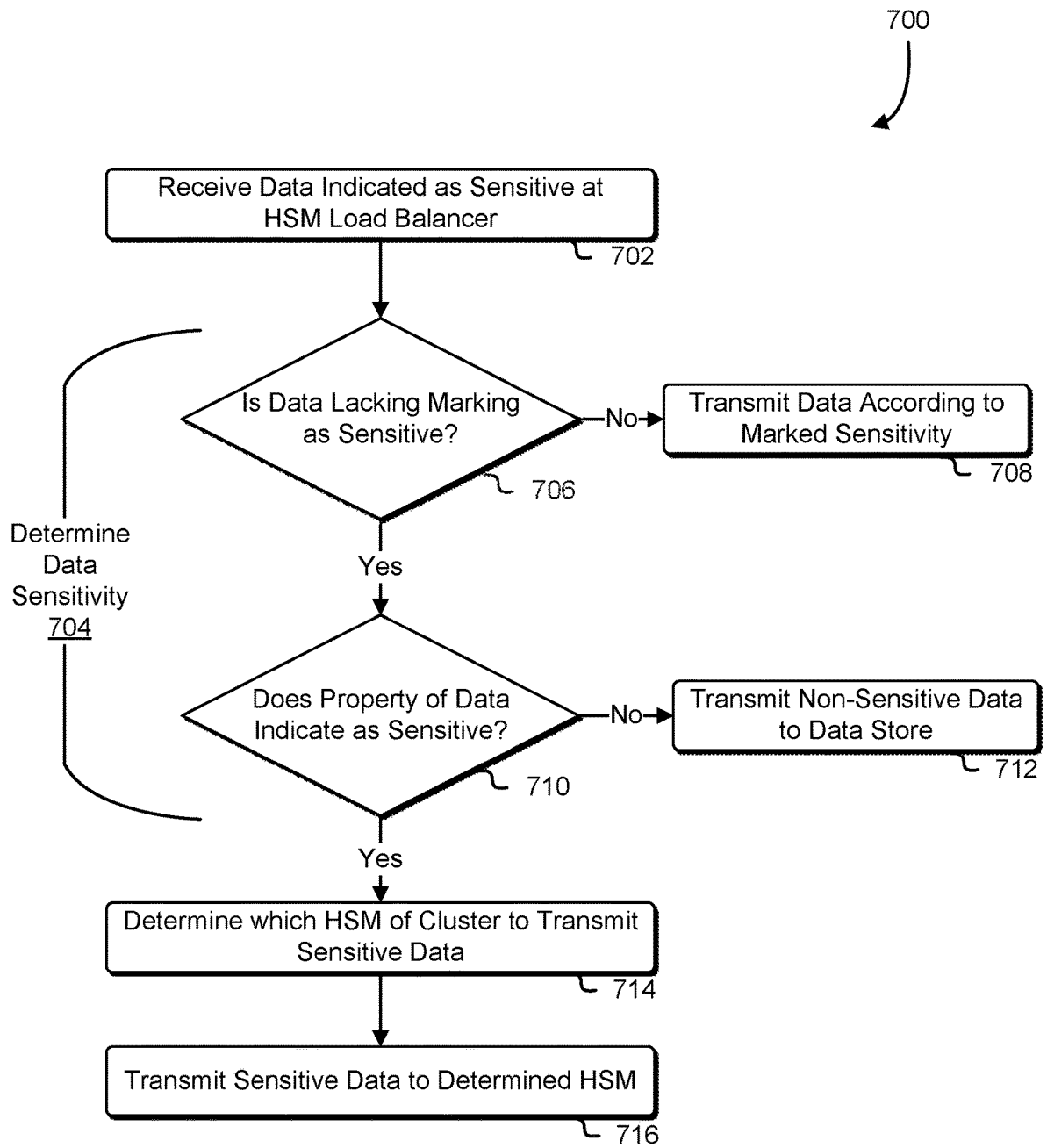
FIG. 7 is a flowchart depicting an embodiment of a system for determining sensitivity of data and transmitting the data accordingly.

FIG. 7 is a flowchart depicting an embodiment of a system for determining sensitivity of data and transmitting the data accordingly. In an environment 700, similar to the environmental system illustrated in FIG. 2, a load balancer can receive 702 or otherwise obtain data from a customer device. In an embodiment, the load balancer can obtain the data from an HSM client operating on the customer device. In one example, the load balancer is an HSM loader balancer separate from an HSM. In another example, the load balancer is an HSM that can store the data locally. Data can be encapsulated within a data object, such as a cryptographic object. A data object can include the data and metadata. Metadata can include properties, such as in table fields that describe or characterize the data. Data object metadata can include an indication or marking of the data as sensitive, a data type of the data, or a timestamp, such as when the data was generated, when the data object was formed, first use time, or a last use time.

The load balancer can determine 704 sensitivity of the obtained data, which can include one or more sub-determinations. The load balancer can determine 706 that the data, or request indicating the data, is lacking a marking as sensitive. For example, the data can be encapsulated in a data object, the data object including metadata indicating a property of the data indicative of the data being sensitive. In an embodiment, metadata can include information, such as discussed in FIG. 4, indicating that the data is sensitive. In an embodiment, a request obtained by the load balancer to store the data can indicate that the data is sensitive. For instance, the request can be from the customer device. In an embodiment, an HSM client can process the request to determine sensitivity of the data and include such a determination by updating the request transmitted to the load balancer.

If the data is marked or indicated as sensitive, the load balancer can transmit 708 the data accordingly. For instance, data marked as sensitive can be directed to an HSM while data marked as non-sensitive can be directed to a data store separate from an HSM. Alternatively, if the data is not marked or indicated with a sensitivity, the load balancer can determine 710 whether a property of the data is indicative of sensitivity of the data. For instance, metadata included with the data can contain a property or field indicative of a data type of the data. The load balancer can access a database table to perform a lookup operation to associate the data type with a corresponding listing of sensitivity as indicated in the database table. Alternative factors can also weigh on the load balancer determination of sensitivity, such as time stamp information or an identifier of the customer device that requested the data be stored. In an embodiment, the HSM client can determine sensitivity of the data in accordance with a rule or policy, such as described above.

If the property of the data indicates the data as non-sensitive or characterized by lacking sensitivity, the load balancer transmits 712 such non-sensitive data to a data store. The load balancer can transmit the data to the data store by an encrypted session, such as TLS or within a secure communication channel, such as a VPN. In an embodiment, the load balancer can update a database used by the HSM client to associate an identifier of the data with a reference to a location in the data store. Updating the database can include generating or modifying a key handle for the data indicative of the data being stored in the data store.

If the property of the data indicates the data as sensitive, the load balancer can determine 714 which HSM to transmit the sensitive data. For example, the HSM client can be configured to distribute sensitive data to a specific HSM based on a property of the data (such as data type) or a property of the HSM as indicated in the request. A property of the HSM can refer to hardware characteristics of the HSM, network characteristics of the HSM, or physical characteristics of the HSM (such as a geographic location of the HSM). The HSM load balancer then transmits 716 the determined sensitive data to the determined HSM. The HSM can transmit the data to the HSM by an encrypted session, such as TLS or within a secure communication channel.

Figure 8:
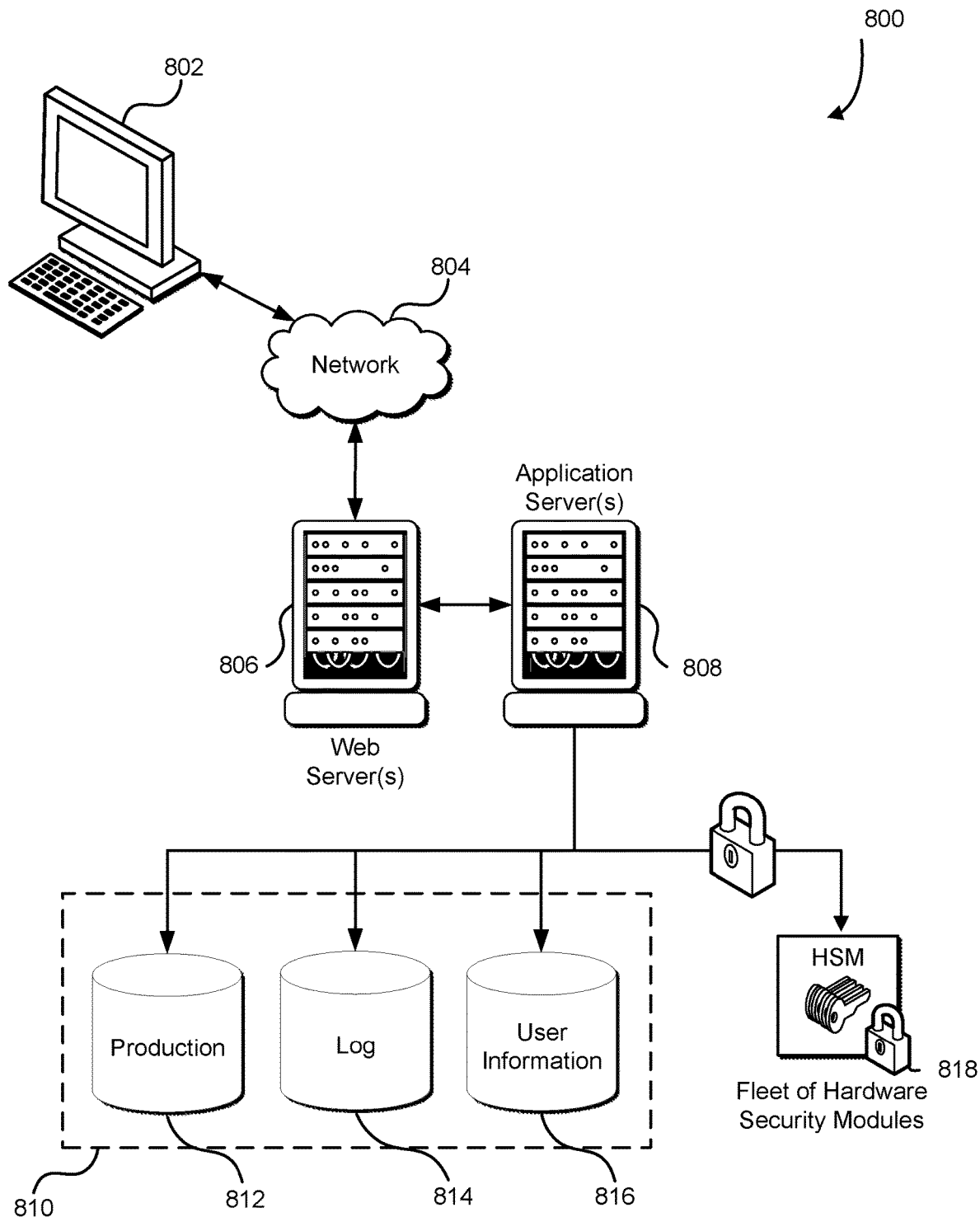
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems can be used, as appropriate, to implement various embodiments. In an embodiment, the system includes an electronic client device 802, which includes any appropriate device operable to send and/or obtain requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to obtain and respond to communications (e.g., web service application programming interface (API) requests) over a network. As used herein, unless otherwise stated or clear from context, the term "data store" refers to any device or combination of devices capable of storing, accessing and retrieving data, which can include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, a cluster of hardware security modules 818 illustrated includes mechanisms for decrypting information, including ciphertext of encrypted data and encrypted cryptographic keys, and encrypting information, such as to encrypt plaintext data and wrap cryptographic keys, which can comprise one or more steps of a reencryption process described herein. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to obtain instructions from the application server 808 and obtain, update or otherwise process data in response thereto, and the application server 808 provides static, dynamic, or a combination of static and dynamic data in response to the obtained instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

Generally, embodiments of the present disclosure can use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model can also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Information can be said to be programmatically unexportable if there is no legitimate way to programmatically cause (e.g., through an interface of the device) the device to provide the information). The information can be maintained, for example, such that there is no request mechanism (e.g., application programming interface (API) call) for causing hardware, with access to the information in plaintext form, to reveal the information in plaintext form. As an example, a device storing the information (e.g., cryptographic module) can be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information can be maintained such that the information is obtainable through a limited number of authorized uses, which can require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive or otherwise obtain, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented client-side method, comprising:
    obtaining, at a hardware security module (HSM) client, a request to store a data object in a set of HSMs, the request specifying a property of the data object indicative of the data object lacking a classification as sensitive;
    determining, based on the specified property and by the HSM client, to store the data object outside the set of HSMs;
    as a result of determining to store the data object outside the set of HSMs, transmitting, by the HSM client, the data object to a data store outside of the set of HSMs; and
    updating a database used by the HSM client to associate an identifier of the data object with a reference to a location in the data store.

2. The computer-implemented method of claim 1, wherein the method further comprises:
  obtaining, at the HSM client, a second request to store a second data object in the set of HSMs, the second request specifying a property of the second data object;
  determining, based on the specified property and by the HSM client, to store the second data object inside the set of HSMs; and
  as a result of determining to store the second data object inside the set of HSMs, transmitting, by the HSM client, the second data object to an HSM of the set of HSMs.

3. The computer-implemented method of claim 1, wherein the method further comprises:
  obtaining, at the HSM client, a third request to store a third data object, the third request specifying the third data object as non-sensitive;
  determining, based on a characteristic of the third data object, to store the third data object inside the set of HSM; and
  as a result of determining to store the third data object inside the set of HSMs, transmitting, by the HSM client, the third data object to an HSM of the set of HSMs.

4. The computer-implemented method of claim 1, wherein the request specifies the property in metadata of the data object that indicates a data type corresponding to non-sensitive data.

5. A system, comprising:
  one or more processors; and
  memory that stores computer-executable instructions that are executable by the one or more processors to cause the system to:
    obtain a request to store data in a cryptographic device, the request specifying a property of the data indicative of the data lacking a classification as sensitive;
    determine, based on the specified property, to store the data outside the cryptographic device; and
    transmit the data to a data store outside of the cryptographic device to fulfill the request.

6. The system of claim 5, wherein the computer-executable instructions include further instructions that, as a result of being executed by the one or more processors, further cause the system to update a database used by a client of the cryptographic device to associate an identifier of the data with a reference to an address in the data store.

7. The system of claim 6, wherein the computer-executable instructions that cause the system to obtain the request to store the data further include instructions that cause the system to obtain the request at a client of the cryptographic device.

8. The system of claim 6, wherein the computer-executable instructions that cause the system to determine to store the data outside the cryptographic device further include instructions that, when executed by the one or more processors, cause the system to determine to store the data outside the remote cryptographic device based on a field of metadata indicating a lack of a classification as sensitive.

9. The system of claim 5, wherein the computer-executable instructions that cause the system to obtain the request to store the data further include instructions that cause the system to obtain the request at an intermediary between the cryptographic device and a location to store the data.

10. The system of claim 5, wherein:
  the cryptographic device is a hardware security module (HSM);
  the computer-executable instructions that cause the system to obtain the request to store the data further include instructions that cause the system to obtain the request at the HSM; and
  the computer-executable instructions that cause the system to determine, based on the specified property, to store the data outside HSM further include instructions that cause the system to determine to store the data outside HSM at the HSM.

11. The system of claim 5, wherein the computer-executable instructions include further instructions that, when executed by the one or more processors, further cause the system to:
  obtain a third request to store a third data in a set of cryptographic devices, the third request specifying a property of the third data indicative of the third data including the classification as non-sensitive;
  determine, based on the specified property and according to a policy, to store the third data inside the set of cryptographic devices, the policy indicating that the specified property corresponds to sensitive data; and
  as a result of determining to store the third data inside the set of cryptographic devices, transmit the third data to a cryptographic device of the set of cryptographic devices.

12. The system of claim 11, wherein the request and the third request are of the same request type.

13. A set of non-transitory computer-readable storage media that stores executable instructions that, if executed by one or more processors of a computer system, cause the computer system to:
  obtain a communication to store a data object in a cryptographic device;
  determine, based on data included in the communication, a classification of the data object as lacking sensitivity;
  generate, based on the classification, a determination to store the data object outside of the cryptographic device; and
  transmit the data object to be stored according to the determination.

14. The non-transitory computer-readable storage medium of claim 13, wherein the executable instructions further include instructions that, when executed by one or more processors of the computer system, further cause the computer system to:
  associate, in a database accessible to a plurality of hardware security module including the hardware security module, an identifier of the data object indicating a location of the data object.

15. The non-transitory computer-readable storage medium of claim 14, wherein the executable instructions further include instructions that, when executed by one or more processors of the computer system, further cause the computer system to:
  obtain a communication to retrieve the data object, the communication to retrieve the data object referring to the data object by the identifier;
  determine the location of the data object, the location associated with the identifier as indicated by the database; and
  access the data object from the determined location.

16. The non-transitory computer-readable storage medium of claim 13, wherein the executable instructions further include instructions that, when executed by one or more processors of the computer system, further cause the computer system to:

reclassify the data object as sensitive based on a policy indicating that an obtained data object lacking a specification is to be classified as sensitive;
determine that the data object is to be moved from outside the cryptographic device to the cryptographic device in response to the data object being reclassified as sensitive; and
move the data object from outside the cryptographic device to the cryptographic device.

17. The non-transitory computer-readable storage medium of claim 13, wherein:
the data object is classified as non-sensitive based on metadata included in the data object specifying the data object as non-sensitive; and
a destination to transmit the data object is determined to be a remote cryptographic device based on a rule set indicating that a category of data objects matching the data object are to be stored at the cryptographic device.

18. The non-transitory computer-readable storage medium of claim 13, wherein the data store is outside a private network, the private network including a computing device that generated the communication to store the data object in the cryptographic device.

19. The non-transitory computer-readable storage medium of claim 13, wherein:
the instructions further comprise instructions that, when executed by the one or more processors, cause the computer system to:
select, when the classification of the data object is sensitive, a cryptographic device of a cluster of cryptographic devices; and
update a database to include a location of where the data object is stored at the selected cryptographic device of the cluster, the database associating a plurality of data objects and corresponding storage locations at the cluster and outside the cluster; and
wherein transmitting the data object comprises transmitting the data object to the selected cryptographic device.

20. The non-transitory computer-readable storage medium of claim 13, wherein the instructions further comprise instructions that, when executed by the one or more processors, cause the computer system to:
receive a request indicating a modification to a sensitivity of the data object indicative of the data object comprising sensitive data;
access the data object at the data store;
transmit the data object to a hardware security module; and
remove the data object from the data store.

* * * * *